US009010925B2

(12) United States Patent
Leighton et al.

(10) Patent No.: US 9,010,925 B2
(45) Date of Patent: Apr. 21, 2015

(54) AIR FILM SUPPORT DEVICE FOR AN INKJET PRINTER

(71) Applicant: Xerox Corporation, Norwalk, CT (US)

(72) Inventors: Roger G. Leighton, Hilton, NY (US); Michael F. Leo, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/941,755

(22) Filed: Jul. 15, 2013

(65) Prior Publication Data

US 2015/0015651 A1 Jan. 15, 2015

(51) Int. Cl.
*B41J 2/01* (2006.01)
*B65G 35/00* (2006.01)
*B41J 11/00* (2006.01)

(52) U.S. Cl.
CPC .................................... *B41J 11/0085* (2013.01)

(58) Field of Classification Search
CPC .... B41J 11/004; B41J 11/0085; B65H 29/34; B65H 29/245; B65H 29/248; B65H 5/228; B65H 2406/323
See application file for complete search history.

(56) References Cited

U.S. PATENT DOCUMENTS 5,576,754 A 11/1996 Korem
5,712,672 A 1/1998 Gooray et al.
5,717,446 A 2/1998 Teumer et al.
5,798,825 A 8/1998 Blanding et al.
6,309,046 B1 * 10/2001 Izawa et al. .................... 347/40
6,442,369 B1 8/2002 Swartz et al.
6,781,684 B1 * 8/2004 Ekhoff ....................... 356/237.1
7,281,711 B2 10/2007 Dannemann et al.
7,461,933 B2 12/2008 Deily et al.
7,604,439 B2 * 10/2009 Yassour et al. ................. 406/88
7,828,423 B2 11/2010 Larson et al.
2011/0023757 A1 * 2/2011 Richman et al. ........... 108/50.13
2011/0261131 A1 * 10/2011 Eve et al. ...................... 347/104

FOREIGN PATENT DOCUMENTS

EP 1 209 539 A3 5/2002

* cited by examiner

*Primary Examiner* — Shelby Fidler
*Assistant Examiner* — Tracey McMillion
(74) *Attorney, Agent, or Firm* — Maginot Moore & Beck LLP

(57) ABSTRACT

A system and method prints on a continuous web of imaging material in a printing machine. One or more inkjet printheads deposit ink on the continuous web of imaging material which is supported by rollers along a transport path. An air film device is disposed between rollers to stabilize flatness the transported web during printing. Undesirable dynamic movement of the web toward or away from the printheads resulting from fluttering, troughing or catenary sag of the web is reduced to minimize drop placement error in both cross-track and process directions.

25 Claims, 7 Drawing Sheets

AIR FILM SUPPORT DEVICE FOR AN INKJET PRINTER

TECHNICAL FIELD

This disclosure relates generally to a printer having a transport system and methods for transporting a continuous web of recording media through a printer. The printer and method of printing on the web includes inkjet printheads disposed between rollers supporting the web.

BACKGROUND

In general, inkjet printing machines or printers include at least one printhead unit which ejects drops of liquid ink onto recording media or an imaging member for later transfer to media. Different types of ink can be used in inkjet printers. In one type of inkjet printer, phase change inks are used. Phase change inks remain in the solid phase at ambient temperature, but transition to a liquid phase at an elevated temperature. The printhead unit ejects molten ink supplied to the unit onto media or an imaging member. Such printheads can generate temperatures of approximately 110 to 120 degrees Celsius. Once the ejected ink is on media, the ink droplets solidify. The printhead unit ejects ink from a plurality of inkjet nozzles, also known as ejectors.

The media used in direct printers can be in web form. In a web printer, a continuous supply of media, typically provided in a media roller, is entrained onto rollers which are driven by motors. The motors and rollers pull the web from the supply roller through the printer to a take-up roller. The rollers are arranged along a linear media path, and the media web moves through the printer along the media path.

Some continuous feed inkjet printers form printed images on only a first side of the continuous web, a process referred to as a simplex printing operation. Simplex continuous feed inkjet printers have printhead assemblies with printheads which are configured to eject ink across a printing zone on the continuous web which is less than the width of the web. The printing zone is typically centered on the web with appropriate margins on each side of the printing zone. During a simplex printing operation, the continuous web makes only one pass through the printer. Specifically, a rewinder pulls the continuous web through the printer along the web path only once during a simplex printing operation.

Some continuous feed inkjet printers are configured to form printed images on a first and a second side of the continuous web, which is known as a duplex printing operation. In a duplex printing operation, the continuous web makes two passes through the printer, and is referred to as a half-width dual-pass duplex printing operation. In particular, the continuous web is routed from a web supply through the printer to receive ink on the first side. After the continuous web exits the printer, the continuous web is inverted by an inverting system and is then routed again through the printer to receive ink on the second side.

Web transport systems are used in a variety of applications to transport a web from one location to another. In printing applications, a printing assembly including one or multiple print heads positioned near the web prints patterns onto the web. As the ink is ejected on to the web, the web must remain flat and a predictable distance away from the printing assembly. Web unevenness or variations in distance from the printing assembly can result in poor printing quality. The flatness of the web under a printhead includes two sources of errors. As the web moves under the printhead, the out of plane vibration excited by roller eccentricity and bending stiffness of the web around a roller causes the drop flight time to change which provides process direction drop arrival errors. The second error results from web distortion due to troughing wrinkles of the web in the span between two rollers related to web thickness, width, Rh, and tension. A "trough" wrinkle is a wrinkle with a shallow "U". As the web tension becomes higher, the troughing amplitudes become higher as well. For a typical 20 inch wide web having a thickness of 4 mil, a tension at 3 pli, and a span of 13.1 inch, the wavelength of the troughs are approximately 2.18 inches in length at a height of 0.027 inch. The head spacing from the paper is therefore approximately 1 mm paper in an aqueous ink system and 0.5 mm in a phase change ink printing system. Therefore; both the amplitude of the out of plane vibration and troughing at high tensions can alter the flight time error and possibly allow the paper to touch the printhead surface.

To ensure web flatness, one solution often implemented in the prior art is to stretch the web between two rollers wherein printheads deposit ink on the moving web. The typical arrangement is to print between two rollers. In another embodiment, printing assemblies are located between the rollers and print upon the web which is supported by a vacuum platen which pulls web to the platen to provide a relatively stable printing surface. Vacuum is also referred to as negative pressure herein.

In still another embodiment, the printing assemblies are located in close proximity to the surface of the roller. By printing on the web at a web supported location provided by the roller surface, the web remains relatively stable to provide a stable platform for the deposition of ink. Placing the printhead directly over the tangent of the roller reduces the free span out of plane vibrations and troughing error as implemented on a known phase change ink printer.

In the above embodiments, however, fluttering and troughing of the web affects the stability of the web and thereby introduces printing errors. In the embodiment where the web is supported only by tension where the printing assemblies print, more rollers can be added to the web path to prevent this fluttering action but this enforces the more waterfront curvature to maintain a minimum of 2.5 degrees of wrap/roll to ensure traction to drive the roll. By adding more rollers, the distance between adjacent rollers is reduced and so is fluttering. Even in the embodiment where the print zone is located at the surface of a roller, fluttering of the web before and after the print zone can also negatively affect print quality. This has been measured up to 44 um of deflection at +/−7 mm at the first and last rows of jets in the process direction.

Consequently, what is desired is a web transport system which reduces undesirable movement or fluttering and troughing of the web, in particular when induced by transport through a print zone. By reducing or eliminating the amount of flutter, print quality of text and images is improved.

SUMMARY

A web transport apparatus for transporting a continuous web of recording media past a printhead, the location of which defines a print zone where ink is deposited to image the continuous web, includes a first roller and a second roller each of which is configured to transport the web through the print zone. An air film system is configured to provide a positive air pressure and a negative air pressure to a surface of the continuous web to form an air film on which a portion of the continuous web rests during the imaging of the continuous web in the print zone.

A method of printing on a continuous web of recording media in a printer having a first roller and a second roller and having at least one printhead to deposit ink on a first side of the continuous web in a print zone disposed between the first roller and the second roller includes moving the web from the first roller to the second roller. The method further includes forming an air film at a second side of the web that is opposite the first side of the web by applying a positive pressure and a negative pressure to the second side of the web, the air film supporting the web during movement of the web from the first roller to the second roller to reduce undesirable motion of the web during movement of the web between the first roller and the second roller; and depositing ink onto the web during movement of the web from the first roller to the second roller.

A printer to form ink images on a continuous web of recording media moving in a process direction including a first roller configured to move the continuous web in the process direction and a second roller spaced from the first roller along the process direction and configured to move the continuous web in the process direction. A printhead is configured to deposit ink on a first side of the recording media to form the ink images, wherein the printhead is disposed along the process direction between the first roller and the second roller. An air film system is configured to provide a positive air pressure and a negative air pressure at a second side of the continuous web to form an air film on which a portion of the continuous web rests during imaging of the first side of the continuous web.

DETAILED DESCRIPTION

Figure 1:
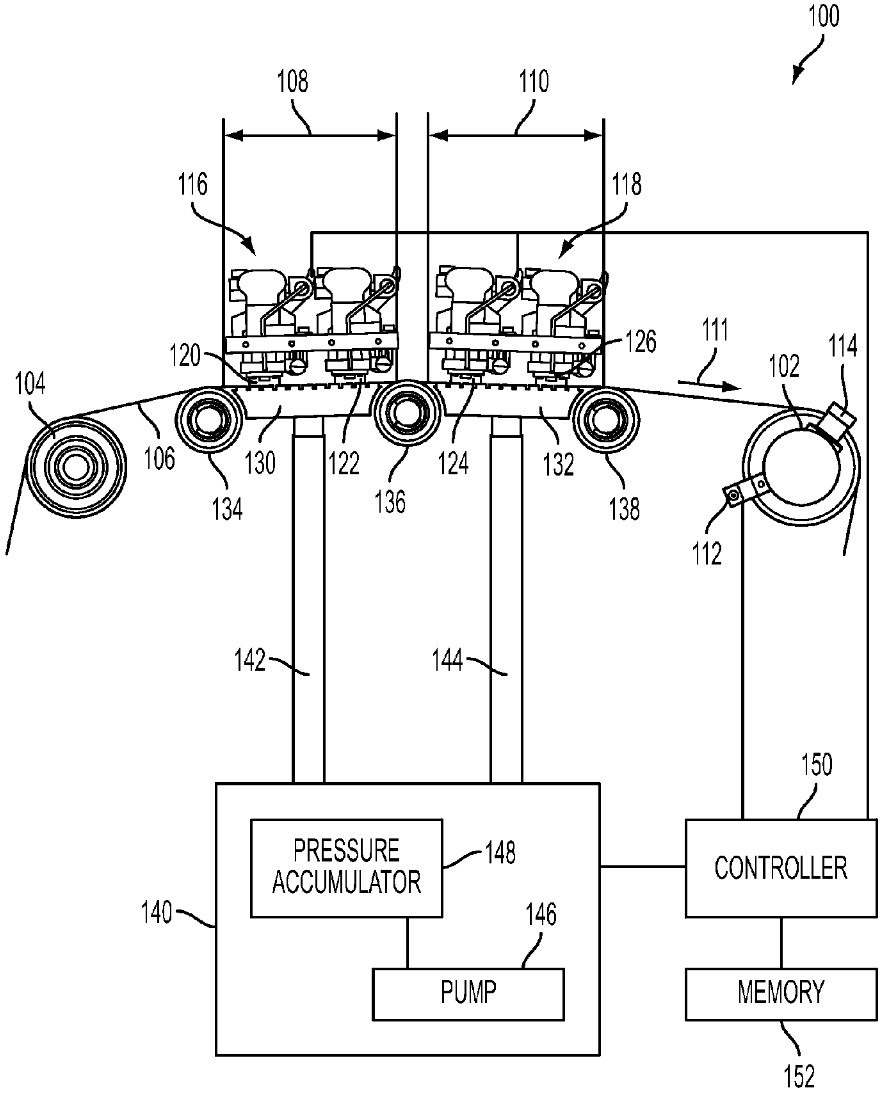
FIG. 1 is a schematic diagram of a web transport apparatus including rollers to move a web across a generally horizontally disposed air film system and past plurality of printheads to print images on the moving web.

For a general understanding of the environment for the system and method disclosed herein as well as the details for the system and method, the drawings are referenced throughout this document. In the drawings, like reference numerals designate like elements. As used herein the term "printer" or "printing system" refers to any device or system which is configured to eject a marking agent upon an image receiving member and includes photocopiers, facsimile machines, multifunction devices, as well as direct and indirect inkjet printers and any imaging device which is configured to form images on a print medium. As used herein, the term "process direction" refers to a direction of travel of an image receiving member, such as an imaging drum or print medium, and the term "cross-process direction" is a direction which is perpendicular to the process direction along the surface of the image receiving member. As used herein, the terms "web," "media web," and "continuous web of recording media" refer to an elongated print medium which is longer than the length of a media path which the web moves through a printer during the printing process. Examples of media webs include rollers of paper or polymeric materials used in printing. The media web has two sides having surfaces which can each receive images during printing. The printed surface of the media web is made up of a grid-like pattern of potential drop locations, sometimes referred to as pixels.

As used herein, the term "roller" refers to a cylindrical member configured to have continuous contact with the media web moving over a curved portion of the member, and to rotate in accordance with a linear motion of the continuous media web. As used herein, the term "angular velocity" refers to the angular movement of a rotating member for a given time period, sometimes measured in rotations per second or rotations per minute. The term "linear velocity" refers to the velocity of a member, such as a media web, moving in a straight line. When used with reference to a rotating member, the linear velocity represents the tangential velocity at the circumference of the rotating member. The linear velocity v for circular members can be represented as: $v=2\pi r\omega$ where r is the radius of the member and $\omega$ is the rotational or angular velocity of the member.

FIG. 1 is a schematic diagram a web transport apparatus 100 including an air film system configured to dampen the motion of the web for printing. A powered roller 102 and a non-powered or freely rotating roller 104 move a web of recording media 106 through a first print zone 108 and a second print zone 110 in a process direction 111. The powered roller 102 is driven by a motor 112 and a velocity sensor 114 generates a signal that corresponds to the rotational velocity of the powered roller 102. The web is pulled by the driven roller 102 at a predetermined speed selected to enable printing in the print zones 108 and 110 by a first printing station 116 and a second printing station 118. Each of the printing stations 116 and 118 includes first and second printhead arrays that deposit ink on the web. The printhead arrays are disposed across the width of the web in a cross-process direction that is perpendicular to the process direction in the plane of the web.

The first printing station includes a first printhead array 120 and a second printhead array 122. The second printing station includes a third printhead array 124 and a fourth printhead array 126. Each of the printhead arrays includes a plurality of ink ejectors which are arranged across the width of web 106 (perpendicular to the transport direction) and which are configured to eject ink drops onto predetermined locations of the web 106. In one embodiment, the ink ejectors are spaced at twelve-hundred (1200) dots per inch. In addition, each of the printhead arrays deposits ink of a different color to form color images. In one embodiment, cyan, magenta, yellow, and black inks are deposited on a first side of the web as the web moves from the roller 104 to the roller 102. Each of the printhead arrays can include one or more printheads ejecting either liquid ink or phase change ink. In some embodiments, thermal inkjet printheads or piezo inkjet printheads are used. Liquid ink printheads eject ink at between seven (7) and ten (10) meters per second (mps). Phase change ink printheads eject ink at approximately 3.5 mps.

The air film system includes a first air film support module 130 and a second air film support module 132. The air film support module 130 is disposed in the first print zone 108 adjacent a second side of the web 106 opposite the first side of the web upon which ink is deposited. A second air film support module 132 is disposed in the print zone 110. Each of the first and second air film support modules 130 and 132 provides a film of air to reduce or eliminate undesirable movement of the web as the web moves through the print zone from a first roller 134, across the air film support module 130, to a second roller 136, across the second air film support module 132, and to a third roller 138. In one embodiment, the distance between the first roller 134 and the second roller 136 is between approximately four to six inches. As used in this document, "a film of air" or "air film" refers to a layer of air sufficiently pressurized to enable the layer of air to support a portion of a web substrate at a distance separate from the structure emitting the pressurized air.

Each of the first and second air film support modules 130 and 132 is coupled to a fluid supply 140 which provides pressurized fluid flow to each of the modules 130 and 132 through a first conduit 142 and second conduit 144. While each of the conduits 142 and 144 is illustrated as a single conduit, each of the conduits 142 and 144 applies both a positive pressure and a negative pressure to the support module to which the conduit is coupled. See FIG. 6 and the related description for additional details of the conduit 142. In one embodiment, the positive pressure and the negative pressure or vacuum are provided by a positive air flow generated by a pump 146 having an output coupled to a pressure accumulator 148. The pump is a diaphragm pump which provides a positive pressure of approximately five (5) psi and a vacuum of approximately ten (10) inches of water ($H_2O$). The pressure accumulator 148 includes a pressure accumulator canister which reduces the pulsation of positive and negative pressures produced by the pump 146 delivered to the support modules 130 and 132. While a single pump is illustrated, in other embodiments two or more pumps are used to provide positive or negative air pressures or the same pump provides both positive pressure and vacuum. Likewise, while a single pressure accumulator is described, in other embodiments two or more pressure accumulators can be used. In still another embodiment, the fluid supply 140 does not include a pressure accumulator.

The web transport apparatus 100 is coupled to a controller 150 and a memory 152. While the controller 150 and memory 152 are illustrated as being dedicated to the transport apparatus 100, in other embodiments a printer controller of a printer incorporating the web transport apparatus 100 including the support modules 130 and 132 and the fluid supply 140 is used to control the delivery of fluid and the speed at which the roller 102 rotates.

Operation and control of the various subsystems, components and functions of web transport apparatus 100 are performed with the aid of the controller 150 and memory 152. In particular, controller 150 either monitors the velocity and tension of the web and or relies on information stored in the memory 152 to determine the amount of positive and negative pressure to be delivered to the first and second support modules 130 and 132. The controller 150 can be implemented with general or specialized programmable processors which execute programmed instructions. Controller 150 is operatively connected to memory 152 to enable the controller 150 to read instructions and to read and write data required to perform the programmed functions in memory 152. In another embodiment, the memory 152 stores one or more values that identify tension levels for operating the printing system with at least one type of print medium used for the web 106. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

Figure 2:
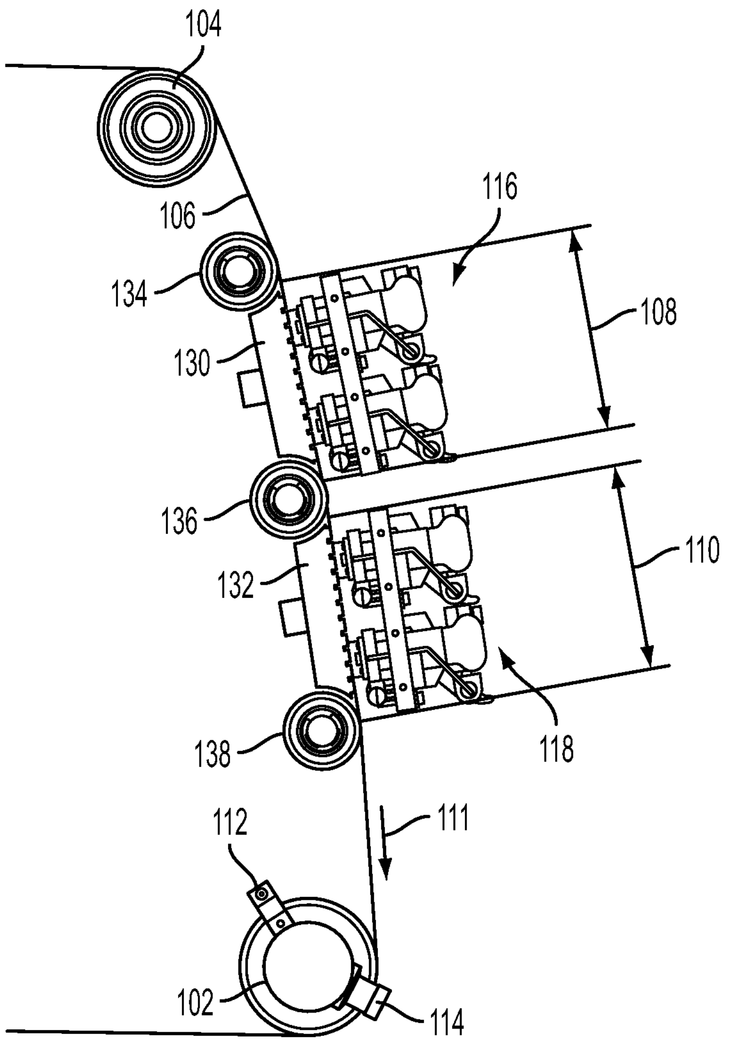
FIG. 2 is a schematic diagram of a web transport apparatus including rollers to move a web across a vertically disposed air film system and past plurality of printheads to print images on the moving web.

FIG. 2 is a schematic diagram of the web transport apparatus 100 that includes the powered roller 102 and the non-powered or freely rotating roller 104 for moving the web of recording media 106. In the embodiment of FIG. 2, the web 106 moves along a generally vertical path as opposed to the generally horizontal configuration of FIG. 1. In FIG. 2, the first print zone 108 and the second print zone 110 are disposed generally vertically. The print stations 116 and 118 and the air film support modules 130 and 132 are also disposed generally vertically. Other orientations of the web and related print stations and film support modules are also possible.

Figure 3:
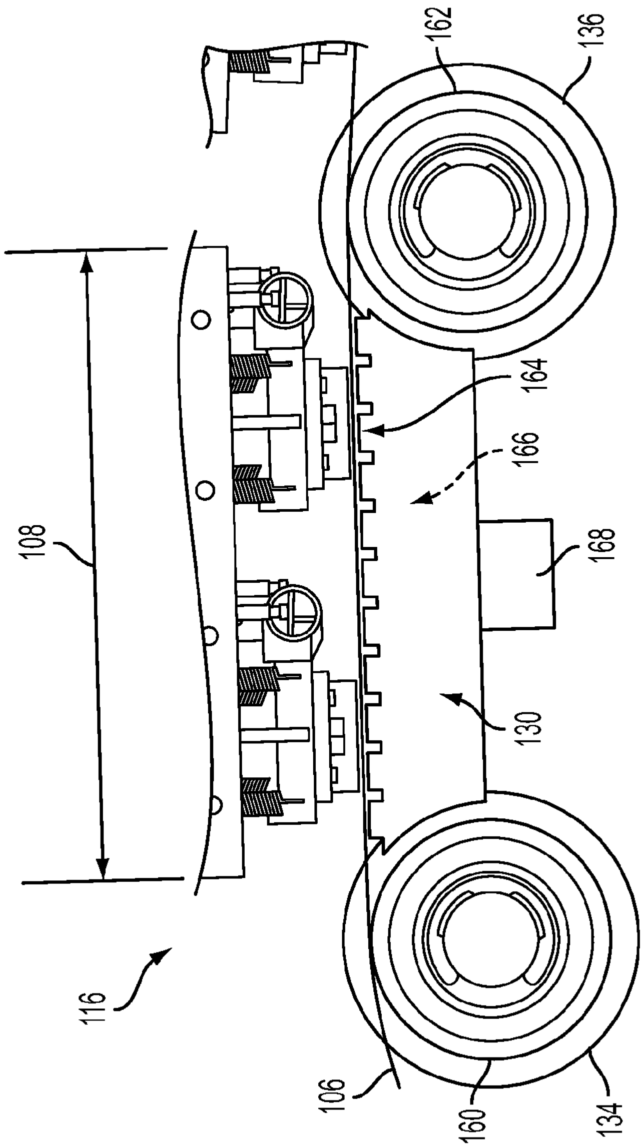
FIG. 3 is an elevational view of an air film device disposed between a first roller and a second roller.
Figure 4:
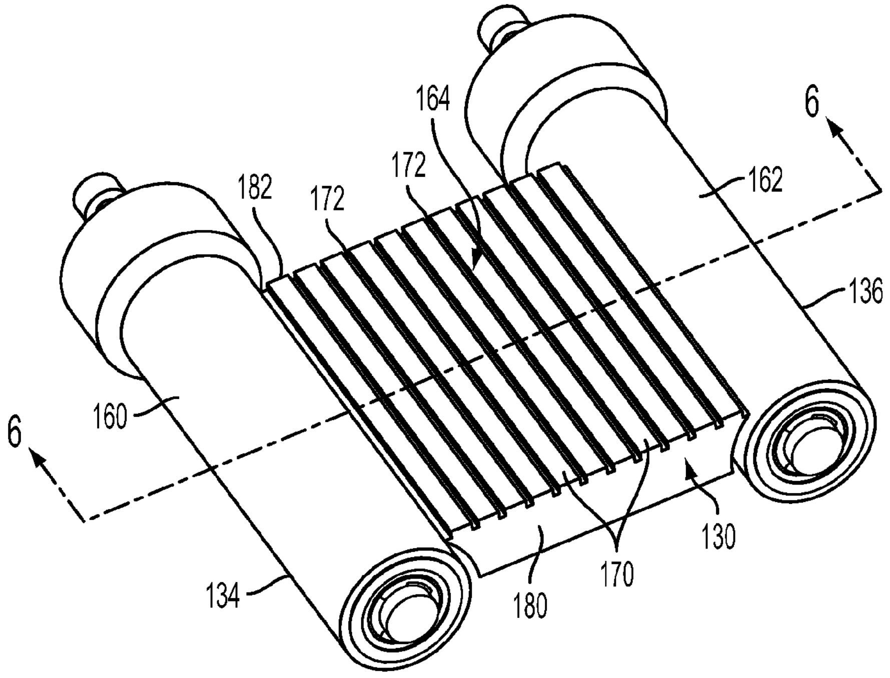
FIG. 4 perspective view of an air film device disposed between a first roller and a second roller.

FIG. 3 is an elevational view of the first print station 116. FIG. 4 is a perspective view of the air film support module 130 including the rollers 134 and 136 of the print station 116. As the support modules 130 and 132 are substantially the same, the description for module 130 applies equally to module 132. In another embodiment, the support modules can be configured differently or the pressures applied by each can be different. In one embodiment where different types of inks are deposited by the first print station 116 and the second print station 118, the modules apply different pressures to accommodate the different types of inks.

Referring now to FIGS. 3 and 4, each of the rollers 104 and 106 includes respectively a contacting surface 160 and 162, which supports the web 134 as the web 134 moves through the print zone 108. The tension introduced to the web by the printer provides a catenary support which maintains the surface of the web as a relatively planar surface upon which to deposit ink. The web 134 is not, however, physically supported by the first support module 130, but is instead spaced from a pneumatic support platen 164 defining a surface of the support module 130 such that the web is in a non-contacting position with respect to the platen 164.

The module 130 includes a plenum 166 which receives the pressurized fluid from the fluid supply 140 through a coupler 168. See FIG. 6 and the related description for additional details. The plenum 166 includes the platen 164 which is partitioned into a plurality of regions including a plurality of negative pressure areas 170 and a plurality of positive pressure areas 172. In the illustrated embodiment, the negative pressure areas alternate with the positive pressure areas. The coupler 168 delivers both a negative pressure and a positive pressure supplied by the fluid supply 140 to respective negative pressure area 170 and positive pressure areas 172.

In the horizontal embodiment of FIG. 1 having a one-thousand two hundred (1200) dpi printhead, the ink is ejected in a vertically downward direction generally along the direction of the pull of gravity. In this embodiment, the drop velocity is in the range of 3.5 mps and the print speed is roughly five-hundred (500) feet per minute. The printheads deposit ink on the plane of the web and not at the roller. The plane of the web is therefore unsupported between the rollers by any interface with a mechanical support structure and the web can have catenary sag between rollers. In addition, the transported web can include a flutter resulting from changes to the web in tension, paper density in grams per square meter (gsm), velocity, and changes to out of plane span natural frequency as well as the troughs generated by the web tension.

The distance from the printhead to the plane of the web is controlled to substantially reduce or eliminate imaging errors. For instance, a twenty-five (25) micron (um) change in the distance between the printhead to the plane of the web can produce a drop process registration error of twelve (12) μm. In addition, the flutter experienced by the web in a system with the head directly jetting over the tangent of the support roll which lacks the described air film support modules can result in a flutter of forty-four (44) μm peak to peak at the edges of the web where the first row to the last row of ink ejectors are located across a distance of 14 mm where each of the rows is perpendicular to the web transport direction. In one embodiment, the unsupported free span between a first roller and a second roller is approximately one-hundred (100) mm and the head active width is 32 mm row to row. The out of plane vibration can greatly exceed the 44 um measured in an actual system at a distance of 7 mm on each side of a tangent of the roller.

The plenum 166 which includes the platen 164, which is partitioned into a plurality of regions including a plurality of negative pressure areas 170 and a plurality of positive pressure areas 172, provides an air film support. Each of the plurality of negative pressure areas 170 and each of the plurality of positive pressure areas 172 includes a plurality of apertures to respectively apply either a vacuum (areas 170) or a positive air flow (areas 172). The platen 164 includes a plurality of vacuum apertures or channels disposed in the areas 170 and a plurality of positive air flow apertures or channels in the areas 172 to both pull and push the transported web from the second side of the web disposed adjacent to the platen 164.

The dual push-pull force provided by the areas 170 and 172 dampens web vibrations as well as provides a non-contact film of air between the platen 164 and the web. The film of air is configured to reduce or prevent contact of the web with the platen 164 thereby reducing image quality problems including those resulting from image drag out where the wax surface on a first side of the web scrapes the platen and deposits wax or uncured ink on the surface of the platen. This can lead to smudge and scrape lines in the process direction. By providing a web transport apparatus including vacuum applying apertures and positive air flow applying apertures, dampening of the flutter, flattening the troughs, and control of the catenary sag, especially on heavier webs, is provided.

As illustrated in FIG. 4, each of the areas 170 and 172 extends from a first side wall 180 to a second side wall 182 of the platen 164. Each of the areas is also generally rectangular in shape and has a predetermined length and width. The length of each of the areas is defined as being perpendicular to the transport direction and the width is defined as being taken parallel to the transport direction. The length of the areas is determined according to the largest width of the media being transport. For instance, if an eighteen (18) inch wide web is being imaged, the length of the area is from approximately seventeen and one-half (17.5) inches up to eighteen (18) inches. The length of the area need not be the same as the width of the media. In other embodiments, the length of the areas of apertures is adjusted according to the width of the web being transported. In one embodiment, the plenum includes multiple chambers each of which can be operatively connected to the positive or negative pressure sources. If the web being transported includes a width of less than the maximum width accommodated by the printer, some chambers providing pressures toward the edges of the media are turned off or disconnected from the fluid supply. In this way, different widths of media are accommodated.

The area ratios, i.e., the ratio of the vacuum areas 170 to the positive flow areas 172, are such that a relatively small diaphragm pump is used. Generally, the area of a vacuum area 170 is approximately three (3) times the area of a positive pressure area 172. In one embodiment, the diaphragm pump provides a positive pressure of five (5) pounds per square inch (psi) and the vacuum side of the same pump provides a vacuum of ten (10) inches of $H_2O$. As described above, the supplies for both pressure sources, in one embodiment, are pumped into the pressure accumulator canister 148 to reduce the pulsation of the pressures delivered to the platen 164. In one embodiment at a web speed of 500 fpm, the entrained air between the printheads and the platen maintains a separation between the surface of the platen 164 and the web. As the speed of the web increases the pressures are reduced when compared to pressures applied during a slower speed of the web.

Figure 5:
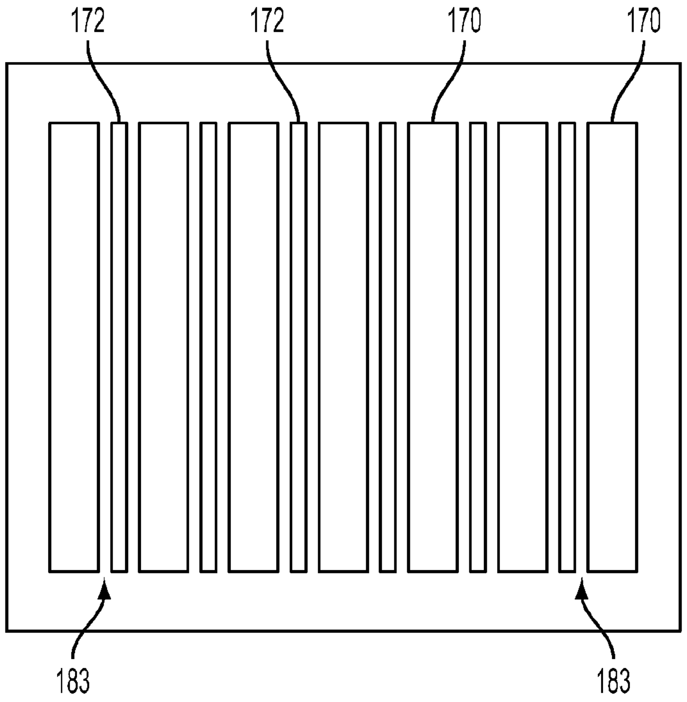
FIG. 5 is a schematic plan view of an air film device including a plurality of regions dedicated to regions of positive air flow and negative air flow.

FIG. 5 illustrates the alternating areas of the vacuum areas 170 and the positive pressure areas 172. The air film is generated by the interaction of the generated positive and negative pressure areas which provides a support pressure pad located between the platen and the web. In one exemplary embodiment, the web is supported by the air film without forming a raised area or a bulge in the web between the rollers 134 and 136 and in particular, in the middle of the span between the two rollers. To provide an air film which maintains the imaging surface of the web at a substantially planar surface, the generated air flows are considered to be generally small to provide a gap between the platen 164 and the web. The flow rates are generally a fraction of a cubic foot per meter (camp). In one embodiment, a gap of approximately fifty (50) μm is provided across the span from the roller 134 to the roller 136. In this configuration, the thickness of the air film is maintained at a tolerance of ±ten (10) μm. In one embodiment, the flatness goal is approximately 5 to 10% of the expected displacement excursions.

The horizontal and vertical configurations of FIGS. 1 and 2 generally include a similar or a same thickness of the air film of approximately 50 μm. The air flow, both positive and negative, required to provide the air film however, can be different in one embodiment when compared to the other. Since the web in the vertical configuration does not experience the same amount of catenary sag as does the horizontal configuration, the air flows required to maintain desired air foil, in some embodiments, are different. In each configuration, however, the air foil should provide a relatively planar web surface upon which to eject ink.

In other embodiments, the amount of air flow and vacuum applied varies across the platen 164. Depending on the distance between rollers, the pressure applied toward the rollers is different than the pressure applied toward the area located in a middle portion between the rollers.

As seen in FIGS. 3 and 4, the upper surface of positive air flow area 172 is recessed from the upper surface of the negative air flow area 170. In other embodiments, the upper surface of each area 170 and 172 are coplanar. In addition, while a non-aperture space 183 is illustrated between adjacent areas 170 and 172, these areas are not necessary. In other embodiments, the apertures of one area can be immediately adjacent the apertures of another area or intermingled along the edges of adjacent areas.

In still another embodiment, the positive air flow apertures and vacuum apertures are not restricted to an area but can be intermingled throughout the platen or in predetermined areas. In these configurations, a positive air flow aperture is immediately adjacent to a negative air flow aperture throughout the entire platen or within certain areas of the platen. In one embodiment, areas having a single type of aperture can be disposed adjacently to an area having apertures of both types. Other embodiments include alternating holes of various diameters provided either throughout the platen or within certain areas of the platen.

In some embodiments, the apertures define a generally circular cross-section. In other embodiments, other configurations of holes are circular, oval, rectangular and slotted.

In each of the described embodiments, the flow of both positive and negative air flows generates an air foil which dampens undesirable movement of the web without floating the web to a condition where the imaging side of the web is sufficiently distorted and affects proper imaging. The flow rate, both positive and negative should not disturb the jetting of ink on the web where the ink is ejected. Such considerations are taken into account when different paper sizes are being imaged. Likewise, the configuration of the air foil support and the air flows should be directed such that the air flows do not affect the thermal performance of the printheads which can affect active jetting from the ejectors.

Figure 6:
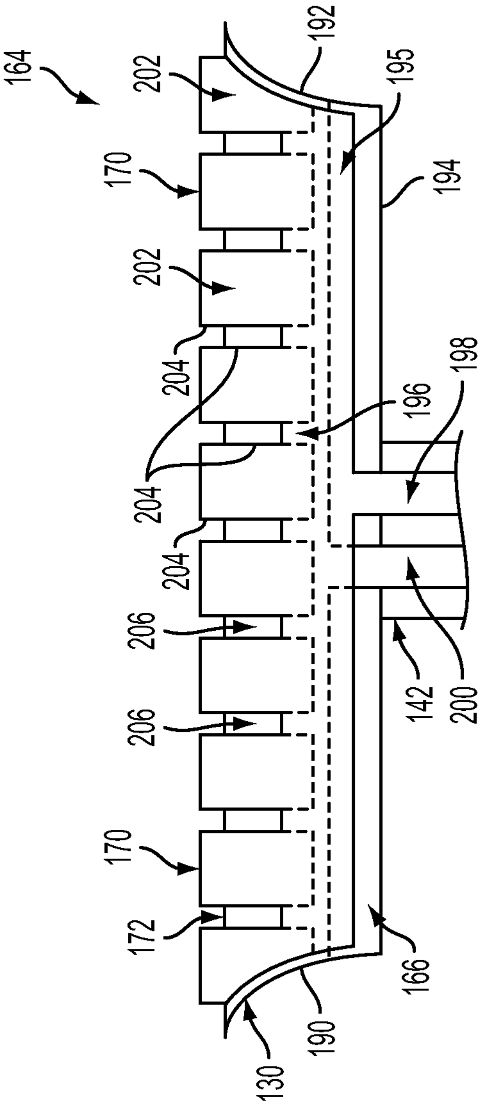
FIG. 6 is a sectional view taken along a line 6-6 of the air film support module of FIG. 4.

In one embodiment, the thickness of the air foil is predetermined and not changed when media of different types is being imaged. Since the attributes of the media, including density, can change depending on the type of media, the controller in other embodiments is configured to provide an air foil having an adjustable thickness by adjusting pressures and locations of the platen and rollers. In one type of thin media, for instance onion skin, the amount of pressures for the air foil is different than the amount of pressures for a thicker media, such as letter stock. A user interface (not shown) to the controller, enables an operator or user to configure the controller signals transmitted from the controller to the fluid supply 140 to provide the desired air foil. Automatic detection of the media type is also possible. Consequently, applied vacuum pressure and applied positive pressures are selected based on one or more of the following: distance between rollers; type of media including the thickness and width of the media; transport speed of the web, and printhead orientation FIG. 6 is a sectional view of the air film support module 130 taken along a line 6-6 of the air film device of FIG. 4. As illustrated in FIG. 6, the plenum 166 is defined as the interior space of the module 130 and is defined by the platen 164, the first side wall 180, the second side wall 182 (See FIG. 4), a third side wall 190, a fourth side wall 192, and a bottom wall 194 to which the first conduit 142 is operatively connected. The third side wall 190 and the fourth side wall are curved to accommodate the outer surface of the rollers. In this way, the platen 164, and in particular the apertures at the edge of the platen can be spaced in close proximity to the rollers.

Each of the walls in combination with the platen define the plenum 166 which is divided into at least a negative pressure chamber 195 and a positive pressure chamber 196, each of which is respectively coupled to a negative pressure conduit 198 and a positive pressure conduit 200. The negative pressure conduit 198 is operatively coupled to the negative pressure source of the pump 146 and the positive pressure conduit 200 is operative coupled to the positive pressure source of the pump 146. While the conduit 142 is illustrated as an additional structure surrounding the conduits 198 and 200, in another embodiment, the conduit 142 is not included and the conduits 198 and 200 are exposed.

The negative pressure chamber 195 includes a plurality of negative pressure ducts 202 each of which is coupled to the conduit 198 through the chamber 195. Each of the ducts 202 includes one or more upstanding sidewalls 204 which enable negative pressure to be present at the negative pressure areas 170. The positive pressure chamber 196 includes a plurality of positive pressure ducts 206 each of which is coupled to the conduit 200 through the chamber 196. Each of the positive pressure ducts 206 shares a sidewall 204 with an adjacent negative pressure duct 202 to enable positive pressure to be present at the positive pressure areas 172. This structure enables the negative areas to pull the positive pressure over the platen from one area 172 to another area 170. In another embodiment, the positive pressure ducts 206 can include sidewalls which are not shared with the sidewalls 204, but which are separate and distinct sidewalls.

Figure 7:
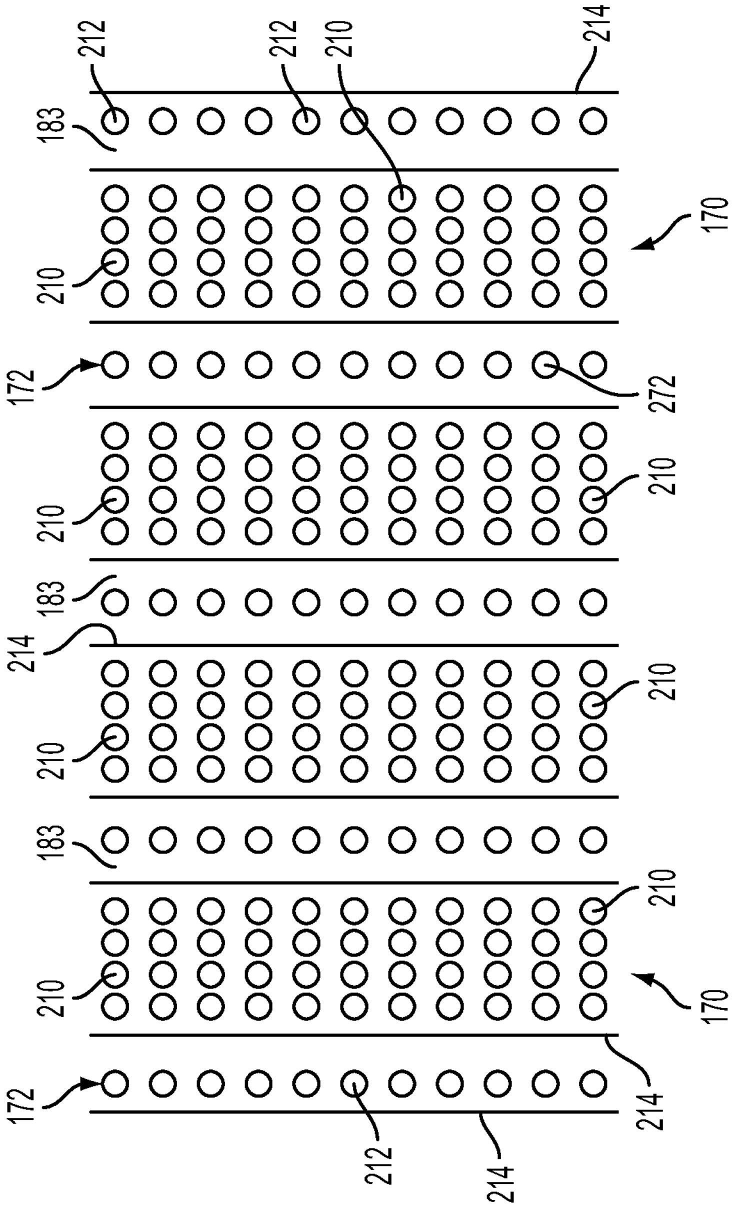
FIG. 7 is a plan view of a portion of the plurality of regions of FIG. 5 including a plurality of apertures.

FIG. 7 is a plan view of a portion of the plurality of the negative pressure areas 170 and the positive pressure areas 172 of FIG. 5. Each of the plurality of negative pressure areas 170 includes a plurality of apertures 210 which are operatively connected to respective ducts 202 and which provide a negative pressure at the second side of the web 106. Each of the plurality of positive pressure areas 172 includes a plurality of apertures 212 which are operatively connect to respective ducts 206 and which provide a positive pressure at the second side of the web 106.

While FIG. 7 illustrates the pressure areas 170 as having four columns of apertures evenly spaced, other configurations are possible. Likewise, while the pressure areas 172 are illustrated having a single column of apertures, other configurations are possible. Generally, however, the number of apertures within a pressure area 170 is greater than the number of apertures within a pressure area 172. In other embodiments, the number of apertures within the pressure areas 172 can be greater than the number of apertures within the pressure areas 170 depending on the amount of pressure being supplied to the apertures as well as the size and configuration of the apertures. Also, while the apertures 210 and 212 are illustrated as being of the same size and configuration, in other embodiments the apertures are of different sizes and configurations. In other embodiments, the apertures are not circular in shape but include slots, ovals, and/or crosses.

The lines 214 indicate the location of a portion of the sidewalls 204 which extend from the surface of the platen defining the positive pressure areas 180. While the columns of apertures 212 are generally illustrated as being centrally located between adjacent sidewalls 204, in other embodiments the columns of apertures 212 need not be centrally aligned. In other embodiments, the apertures 210 and 212 are not arranged as columns, but are staggered. Consequently, the size and configuration of the apertures can be selected based on the amount of positive and/or negative air pressure being delivered to the platen.

It will be appreciated that variants of the above-disclosed and other features and functions, or alternatives thereof, can be desirably combined into many other different systems, applications or methods. Various presently unforeseen or unanticipated alternatives, modifications, variations or improvements can be subsequently made by those skilled in the art which are also intended to be encompassed by the following claims.

What is claimed is:

1. A web transport apparatus for transporting a continuous web of recording media past a printhead the location of which defines a print zone where ink is deposited to image the continuous web comprising:

a first roller configured to transport the web in a process direction through the print zone, the first roller being oriented perpendicular to the process direction through the print zone;

a second roller configured to receive transport the web after the web has passed through the print zone, the second roller being oriented perpendicular to the process direction through the print zone;

an air film system configured to provide a positive air pressure and a negative air pressure to a surface of the continuous web to form an air film on which a portion of the continuous web rests during the imaging of the continuous web in the print zone; and a controller operatively connected to the air film system to operate the air film system to provide the positive air pressure and the negative air pressure with reference to a distance between the first roller and the second roller, a thickness and a width of the continuous web, and a transport speed of the continuous web.

2. The web transport apparatus of claim 1, the air film system further comprising:

an air film module disposed between the first roller and the second roller, the air film module having a first plurality of first apertures and a second plurality of second apertures.

3. The web transport apparatus of claim 2, the air film system further comprising:

a pneumatic device operatively connected to the air film module and configured to provide the positive air pressure and the negative air pressure to the air film module.

4. The web transport apparatus of claim 3, the air film module further comprising:

a plurality of first apertures operatively connected to the pneumatic device to provide the positive air pressure at the surface of the continuous web and a plurality of second apertures operatively connected to the pneumatic device to provide the negative air pressure at the surface of the continuous web.

5. The web transport apparatus of claim 4 wherein the plurality of first apertures is arranged on the air film module in a plurality of first aperture groups and the plurality of second apertures is arranged on the air film module in a plurality of second aperture groups, and the first aperture groups are alternately located with the second aperture groups.

6. The web transport apparatus of claim 4 wherein the first apertures and the second apertures alternate with respect to one another.

7. The web transport apparatus of claim 4 wherein each of the first apertures is smaller than each of the second apertures.

8. The web transport apparatus of claim 4 wherein the pneumatic device includes a pump that generates both the positive air pressure and the negative air pressure.

9. The web transport apparatus of claim 8 further comprising:

a pressure accumulator operatively connected between the pump and the air film module, the pressure accumulator being configured to reduce an effect of changes to at least one of the positive air pressure and the negative air pressure generated by the pump.

10. The web transport of claim 9 wherein the first apertures are operatively connected to the pressure accumulator to provide the positive air pressure to the surface of the continuous web.

11. The web transport apparatus of claim 10 wherein the second apertures are operatively connected to the pressure accumulator to provide the negative air pressure to the surface of the continuous web.

12. The web transport apparatus of claim 11 wherein the air film module defines a plane generally parallel to the surface of the continuous web, and the first apertures are equidistantly spaced a first distance from the surface of the web.

13. The web transport apparatus of claim 12 wherein the second apertures are spaced equidistantly a second distance from the surface of the web.

14. The web transport apparatus of claim 13 wherein the first distance and the second distance are substantially equal.

15. The web transport apparatus of claim 12 wherein an outer surface of the first roller and an outer surface of the second roller define a plane and a distance between the plane formed by the outer surfaces of the first and the second rollers and the plane formed by the air film module is approximately 40 to 60 microns.

16. A method of printing on a continuous web of recording media in a printer having a first roller and a second roller, both of which are oriented in a direction perpendicular to a process direction of the continuous web through a print zone and having at least one printhead to deposit ink on a first side of the continuous web in the print zone disposed between the first roller and the second roller comprising:

moving the web from the first roller to the second roller;

forming an air film at a second side of the web that is opposite the first side of the web by operating a fluid supply with a controller to apply applyi-ng a positive pressure and a negative pressure to the second side of the web with reference to a distance between the first roller and the second roller, a thickness and a width of the continuous web, and a transport speed of the continuous web, the air film supporting the web during movement of the web from the first roller to the second roller to reduce undesirable motion of the web during movement of the web between the first roller and the second roller; and depositing ink onto the web during movement of the web from the first roller to the second roller.

17. The method of claim 16, the formation of the air film further comprising:

applying the positive pressure and the negative pressure to apertures in a platen.

18. A printer to form ink images on a continuous web of recording media moving in a process direction comprising:

a first roller configured to move the continuous web in the process direction;

a second roller spaced from the first roller along the process direction and configured to move the continuous web in the process direction, the first roller and the second roller being oriented in a direction perpendicular to the process direction;

a printhead configured to deposit ink on a first side of the recording media to form the ink images, the printhead being disposed along the process direction between the first roller and the second roller;

an air film system configured to provide a positive air pressure and a negative air pressure at a second side of the continuous web to form an air film on which a portion of the continuous web rests during imaging of the first side of the continuous web; and a controller operatively connected to the air film system to operate the air film system to provide the positive air pressure and the negative air pressure with reference to a distance between the first roller and the second roller, a thickness and a width of the continuous web, and a transport speed of the continuous web.

19. The printer of claim 18, the air film system further comprising:

an air film module disposed between the first roller and the second roller, the air film module including a plurality of first apertures and a plurality of second apertures, the plurality of first apertures being coupled to a negative air pressure source and the plurality of second apertures being coupled to a positive air pressure source.

20. The printer of claim 19 wherein the plurality of first apertures is arranged on the air film module in a plurality of first aperture groups and the plurality of second apertures is arranged on the air film module in a plurality of second aperture groups, wherein the first aperture groups are alternately located with the second aperture groups.

21. The printer of claim 20 wherein the air film module includes a negative pressure chamber operatively connected to the plurality of first aperture groups and a positive pressure chamber operatively connected to the plurality of second aperture groups.

22. The printer of claim 21 wherein the number of apertures in one of the plurality of first aperture groups is greater than the number of apertures in one of the plurality of second aperture groups.

23. The printer of claim 18 further comprising:

a third roller spaced from the second roller along the process direction;

a second printhead disposed between the first and second rollers;

a third printhead disposed between the second and third rollers;

a fourth printhead disposed between the second and third rollers;

the air film system includes a first air film module disposed between the first roller and the second roller and a second air film module disposed between the second roller and the third roller; and the controller being further configured to operate the first air film module to provide a first positive air pressure and a first negative air pressure for a film of air between the first air film module and the continuous web, and to operate the second air film module to provide a second positive air pressure and a second negative pressure for a film of air between the second air film module and the continuous web.

24. The printer of claim 23, each of the first air film module and the second air film module further comprising:

a platen having a first plurality of apertures that is coupled to a negative air pressure source and a second plurality of apertures coupled to a positive air pressure source, each platen being disposed adjacent to the continuous web.

25. The printer of claim 24 wherein the first plurality of apertures and the second plurality of apertures are alternately located along the platens of each of the first and second air film modules.

* * * * *